United States Patent [19]
Desmond et al.

[11] Patent Number: 5,991,516
[45] Date of Patent: Nov. 23, 1999

[54] PRINT IMAGE DATA MIDDLE-WARE

[75] Inventors: Randall M. Desmond; Marc R. Grosso, both of Fairport, N.Y.

[73] Assignee: Xerox Corporation, Stamford, Conn.

[21] Appl. No.: 09/070,238

[22] Filed: Apr. 30, 1998

[51] Int. Cl.⁶ .................................................. B41B 15/00
[52] U.S. Cl. ........................... 395/116; 395/112; 395/114
[58] Field of Search .................................. 395/102, 112, 395/114–117, 670–675; 358/400, 403, 468

[56] References Cited

U.S. PATENT DOCUMENTS

| | | | |
|---|---|---|---|
| 5,164,842 | 11/1992 | Gauronski et al. | 358/401 |
| 5,170,340 | 12/1992 | Prokop et al. | 364/143 |
| 5,181,162 | 1/1993 | Smith et al. | 364/419 |
| 5,243,381 | 9/1993 | Hube | 355/204 |
| 5,442,732 | 8/1995 | Matysek et al. | 395/116 |
| 5,517,316 | 5/1996 | Hube | 358/296 |
| 5,559,933 | 9/1996 | Boswell | 395/114 |

*Primary Examiner*—Edward L. Coles
*Assistant Examiner*—Derrick Fields
*Attorney, Agent, or Firm*—R. Hutter

[57] ABSTRACT

In a digital printing system there is a natural hierarchical relationship to the data representing jobs, documents, pages, and page image data (separations). Instead of grouping data by the imposed hierarchical method, the page image data is organized into "bursts," a burst being defined as a series of page images which can be printed without requiring that the digital printer be reconfigured to enable or disable specific printer functions or features. The printer is supplied with a burst whenever a burst is available without regard for job or document boundaries. This method allows the printer to be supplied with image data at optimal speeds and minimizing first-page-out time.

4 Claims, 3 Drawing Sheets

PRINT IMAGE DATA MIDDLE-WARE

FIELD OF THE INVENTION

The present invention relates to digital printing, and addresses the problem of submitting image data to printing hardware in a manner which maximizes throughput and optimizes first page out time.

BACKGROUND OF THE INVENTION

High-speed digital printing presents unique requirements to data-processing equipment. For example, to operate a printing apparatus which is designed to output over 100 page-size images per minute, the ability to make the desired image data of a particular page available to the printing hardware requires very close tolerances in the management of the "overhead" when data is transferred from a memory and applied to the printing hardware. A typical letter-sized page image at 600 dpi resolution, in a format suitable to be submitted to printing hardware is typically of a size of about 4 MB for monochrome and 16 MB for color; when printing hardware demands the image data to print the particular page image, this image data must be accessed from memory within a time frame of approximately 300 milliseconds.

As is known in the art of digital printing, these large quantities of data must be processed in numerous sophisticated ways. For example, image data in a page description language (PDL), such as HP-PCL or PostScript™, must be decomposed into raw digital data, and this raw digital data may often have to be compressed and decompressed at least once before the data reaches the printing hardware. In addition, in a high-volume situation where hundreds of different pages are being printed in various jobs, the particular set of image data corresponding to a page to be printed at a given time-window must be carefully managed.

In digital printing, and particularly in network or color printing, the various specific tasks which must be performed by software and hardware in a system lead to a number of design trade-offs which must be made. One essential trade-off may occur between the requirements for a high or maximum throughput of the printing hardware (that is, having the printer hardware supplied with enough hardware-ready image data to maintain the hardware at maximum physical speed for the longest period of time) and minimizing the time until the first page emerges from the printer, which has been shown to be a major customer requirement. This trade-off centers on the fact that the step of "interpreting" original image data from a PDL to "raw" binary data which is directly operative of printing hardware not only takes a fairly significant amount of time, but also the time required may vary widely depending on the complexity of a particular page image being printed. If a system simply sent binary image data to the printing hardware as it became available from an interpreter, it is likely that the printing hardware would very often find itself waiting for the next page image to be output by the interpreter, thus wasting significant amounts of time.

At the same time, many printer architectures impose special requirements on incoming page image data. Some printing apparatus output pages in an "n to 1" order, meaning that the last page must be printed first so that the ultimate stack of output pages is in a correct order; in this case, it can be seen that an entire set of page images forming a document must be completely processed by the interpreter before any pages can be submitted to the printing hardware: this of course will cause an enormous delay in first page out time. However, if the printing apparatus is designed to output pages in "1 to n" order it would be still be desirable to have a number of page images immediately ready for submission to the printing hardware to minimize the time in which the printing hardware has to wait for the interpreter.

Because there is a distinction between the printing of images via use of image data directly (hardware interface), and the means of getting the image data to the printer (print controller), digital printers are not predisposed to operating on a job, document or page boundary. They primarily work on a page by page basis when printing. This implies that data need not be grouped according to the job or document boundaries when the print controller sends the image data to be printed by the digital printing hardware. Feasibly, a set of print image data pages could be printed transcending job or document boundaries.

"Middle-ware" refers to systems architecture and software which interfaces producers and consumers of data. One often recurring and unique method of organizing data is to describe the data within a hierarchical format. The middle-ware presented herein enables data producers to interface with data consumers for the specific case where those producers and consumers operate on the same set of hierarchically organized data, but do not necessarily work on the same level of data (i.e. job, document, or page boundaries) within the hierarchy. The middle-ware acts as an ideal consumer for the data producer by accepting the data at the level the producer most readily supplies it, and, at the same time, the middle-ware acts as an ideal producer to the data consumer supplying the consumer with data at the level the consumer most readily accepts it. Data supplied by the producer is kept in memory until the consumer needs it. Maximum data throughput is achieved because the middle-ware is always ready to accept data from the data producer, and the middle-ware is always ready to supply the data consumer with data as soon as the consumer requests it (both acceptance of data from the producer and supplying data to the consumer are contingent on whether or not there is data, of course).

The result is a middle-ware for interfacing data producers and consumers of hierarchically organized data within the digital printing framework, while managing such data via a method which maximizes throughput of the data. The key to data throughput maximization is achieved by simply interfacing to the producer as an ideal data consumer (according to the producer's perspective) and, at the same time, interfacing to the data consumer as the ideal data producer (according to the producer's perspective).

The data, as it is prepared for the consumer within this middle-ware, is grouped into what has been termed a burst. A burst consists of a set of data grouped according to the data consumption constraints of the data consumer and is not grouped according to the constraints of delivery of the data by the data producer. Such a middle-ware would be widely reusable and could serve as an interface between any combination of data producer(s) and consumer(s) (one-to-one, one-to-many, many-to-one, and many-to-many relationships are possible) and provides an optimal balance between data producer output and consumer data consumption.

DESCRIPTION OF THE PRIOR ART

U.S. Pat. No. 5,164,842 discloses the basic layout of a high-speed digital copier. The digital copier includes a scanner and printer which can operate asynchronously with respect to one another. The apparatus has a proofing mode in which proofing of one or more pages of a job is effected by interrupting the job currently being scanned by the scanner to scan the proof job while continuing printing other jobs in the print queue. When the proof job is ready, the job being printed is interrupted to print the proof job while resuming scanning of the interrupted job.

U.S. Pat. No. 5,170,340 discloses an electronic reprographic system having a state controller. The state controller includes job programming means including a state holder for monitoring the current operating state of the various system components; plural discrete job processing virtual machines; and a scheduler for managing resources and of setting priorities for the virtual machines to process the requests in an efficient manner.

U.S. Pat. No. 5,181,162 discloses an object-oriented document management and production system, in which documents are represented as objects that may be combined and physically mapped onto a page-by-page layout. Stored objects are organized, accessed and manipulated through a database management system.

U.S. Pat. No. 5,243,381 discloses a method for printing a job, represented by a set of electronic pages with a job reference sheet in a printing system. The method includes the steps of storing the set of electronic pages in a memory section and assigning a unique job identifier to the stored job for indicating a location of the stored job in the memory section.

U.S. Pat. No. 5,442,732 discloses an electronic reprographics system having a "print folder" application. By using a print folder, users may select several jobs in the job file to be printed as a specified number of collated supersets with or without a common finishing selection. Use of a print folder has the advantage of the ability to get a uniform number of sets with uniform finishing characteristics of multiple jobs without editing the individual jobs.

U.S. Pat. No. 5,517,316 discloses a printing machine including a first memory section for storing a job and a printing section with a second memory section. The second memory section communicates with the first memory section for receiving a copy of the job, the copy of the job being printed at the printing section so that job run information is created in response to the printing of the copy of the job. The created job run information is stored in a third memory section, the third memory section being linked with the first memory section by way of a reference for maintaining a record of the printing operations performed on the job.

U.S. Pat. No. 5,559,933 discloses a system for transferring and printing files within a heterogeneous computer network. The system utilizes file mask attributes to automatically generate transfer requests and print requests. In response to user inputs through a graphical user interface, the system updates various file databases, print attribute and transfer attribute libraries, and system configurations before generating a transfer or print request.

SUMMARY OF THE INVENTION

According to the present invention, there is provided a method of submitting page image data, comprising data forming a plurality of discrete page images in a predetermined order, to a printing apparatus. Within the page image data, a series of page images forming a first burst is identified, a burst being a series of page images which can be printed by the printing apparatus without the printing apparatus having to be reconfigured. The printing apparatus requests the first burst from the memory and outputs pages resulting from the page image data in the first burst. The printing apparatus does not request page image data from a second burst from the memory until all pages from the first burst are output.

DETAILED DESCRIPTION OF THE INVENTION

For purposes of the following detailed description, certain key terms will be here explicitly defined.

A "job" is an independent quantity of image data which is submitted to a printing system by a user, with the expectation that the printing system will output pages based upon the job data. A job may contain one or more different documents therein, and several copies of the same document can be said to equal several documents within the job.

A "document" is a self-contained, possibly multi-page desired output from the printing apparatus, based upon the data in the document. A document may contain prints made on different kinds of stock, such as regular bond paper and heavier cover stock, all stapled together. Further, a single document may include both color and monochrome pages.

A "page," for present purposes, shall be defined as the image data which is intended to be placed on one side of a sheet that is output by the printing apparatus. A page may consist of one or more separations, with each separation representing one color plane of image data for a page to be output.

"Page image data" is a quantity of data for causing a printing apparatus to output an image on one side of a sheet, the image based upon the page image data. The page image data should be directly operable of the printing apparatus, in that it does not need decomposition when applied to the printing apparatus, but it may be in the form of compressed decomposed image data or may be compressed raw image data such as a TIFF file.

A "printing apparatus" is a machine which outputs sheets, at least one side of a sheet having an image thereon derived from page image data. As used in the claims, "printing apparatus" could also mean any kind of consumer of decomposed page image data. Further, and with particular reference to the claims, the term "printing apparatus" includes software which is directly operative of printing hardware, such as the "print manager" software described below, which is the software by which the printing apparatus "requests" data in the illustrated embodiment.

A "burst" is a term which shall be specially defined with reference to the present invention.

A "configuration," in the context of the present description, is a list of attributes which typically refer to physical aspects of the printing apparatus which enable output of one or more pages with specific characteristics. The configuration of a printing apparatus shall include, by way of example and not limitation, from which stack of several stacks the sheet to be output could be drawn; the location of a particular output tray to which the page should be sent; and/or whether the output page will contain a monochrome image or full-color image.

Figure 1:
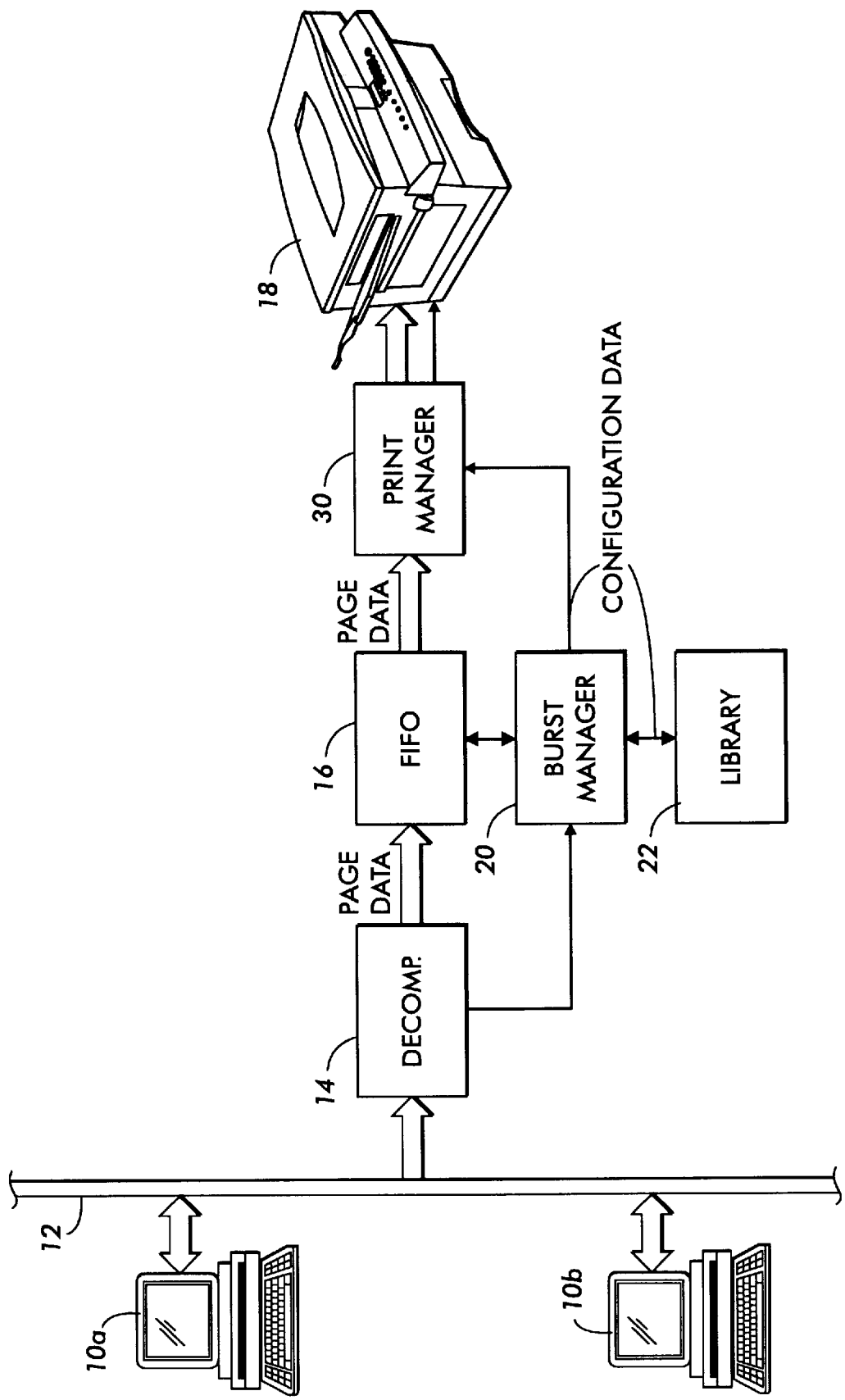
FIG. 1 is a high-level systems diagram showing the essential elements carrying out the method of the present invention.

FIG. 1 is a high-level diagram showing the basic elements of a network printing system. In the Figure, any number of image data sources, such as computers 10a, 10b, (but which could also include, for example, digital scanners, such as forming part of a digital copier) submit image data to be printed over a network 12. Significantly, and as is well known in the art, when image data is submitted in this manner to printing hardware, the data is organized as a "job." As mentioned above, a "job" may include therein a plurality of "documents," and each document may include a number of "pages." The essential part of all image data is in the form of a page description language, or PDL, of any one of a format such as known in the art. The jobs containing this PDL-based image data are submitted to one or more decomposers, such as 14, which convert the PDL-based image data to what can be called "raw" binary data which is generally directly operative of printing hardware, such as an ink-jet printhead or a modulating laser. Typically there would be intermediate steps (not shown in FIG. 1) of selectably compressing and decompressing this binary data output by the decomposer 14, but such compression steps are not immediately relevant to the present invention.

According to the present embodiment of the invention, discrete page images, that is sets of data which are intended to be placed on discrete pages by the printing apparatus, are submitted to a first in, first out buffer indicated as FIFO 16. As the name implies, data corresponding to discrete pages are entered one page at a time into FIFO 16, which holds the pages in the order in which they were received until the page images are submitted to printing hardware 18, which could be a laser, ink-jet, or other type of digital printing apparatus known in the art.

According to a key aspect of the present invention, there is set forth the concept of the "burst" of page images. A burst of page images are a sequence of page images to be output by the printing apparatus 18, whereby all of the pages in a burst require the same general physical configuration of the printing apparatus. If, for example, all of the pages in a consecutive series of pages to be output by the printing apparatus are printed on letter-sized bond paper in monochrome and output into a single output tray, it would be said that all of these pages could form a single burst. If, however, the next page in the series of pages is intended to be printed on legal-sized paper, the printing apparatus would have to be reconfigured by switching from drawing paper from the letter-size stack to the legal-size stack, and therefore this next page for legal-sized paper could not form part of the original burst. Similarly, if the next page in the series were intended to go to a different output tray than the previous series of pages, the printing apparatus would have to be reconfigured to redirect the printed page to the other output tray, and therefore that new page could not be in the previous burst. In other words, whereas a burst is a series of pages to be output by the printing apparatus, a burst ends when it is recognized that the printer configuration required for the next page is different from that of the previous page.

It is significant, in the concept of the burst, that bursts can transcend other aspects of documents output by the printing apparatus. Consider, for example, if it is desired to print a series of stapled booklets, each booklet comprising three bond pages p with a front cover and back cover made of cover stock c. Using a simple convention, each booklet would have the configuration of c p p p c (that is, the three pages p p p bounded by cover stock c on either end). Clearly, because the three middle pages p p p are all on the same stock (all other things being equal) the three middle pages p p p easily form a burst. Because the covers c are printed on cover stock drawn from a different tray than the pages p, it is clear that the covers c cannot be in the same burst as pages p. However, if a series of three such booklets are printed for a total output of c p p p c c p p p c c p p p c, the back cover c of a first document is immediately followed by the front cover c of the second document: the two neighboring cover stocks c c can form a single burst, even though the first c forms the back cover of the first document and the second c forms the front cover of the second document. Similarly, a single burst can include pages from one or more jobs submitted by different users. What is significant is that the burst concept looks only at an opportunity for the printing apparatus 18 to print pages in a series without having to be reconfigured, such as by having to switch input or output trays.

Given the concept of the burst in the context of the present invention, there can be seen in FIG. 1 what is here called a "burst manager" 20. In brief, the burst manager 20 is a software construct which interacts with one or more decomposers 14 or the rest of the print server to identify bursts within a stream of data submitted over the network 12. The identification of a burst can be seen as an opportunity for the printing hardware 18 to operate at close to its maximum rated speed, because it will be in effect known in advance that the printing apparatus 18 will not have to change its physical configuration (such as by changing paper stock, or switching from color to monochrome mode) for an identified series of page images to be output.

Figure 2:
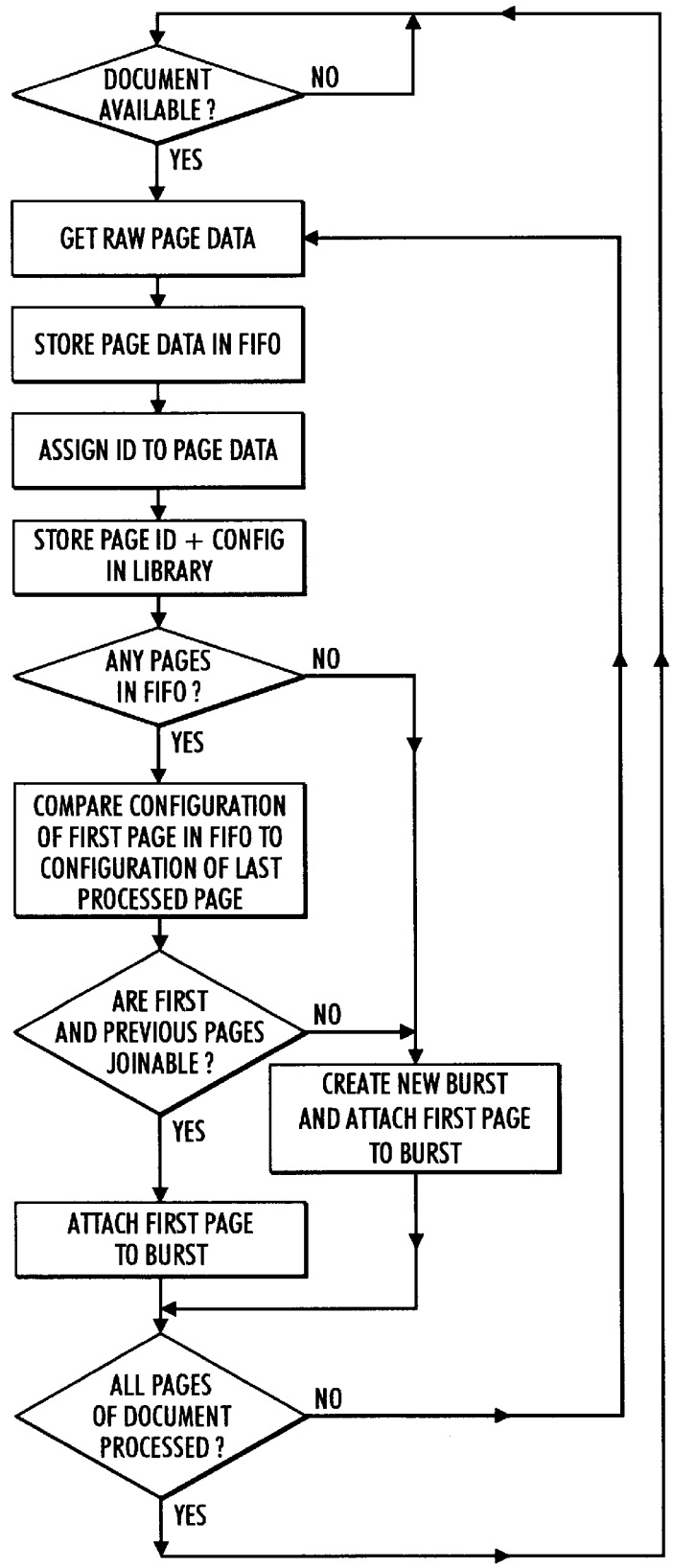
FIG. 2 is a flowchart describing the activity of the "burst manager" of the present invention.

FIG. 2 is a flowchart illustrating the general function of the burst manager 20. To summarize the steps shown in FIG. 2, it can be seen that when a document to be printed becomes available from the decomposer 14, the burst manager causes raw page data output from decomposer 14 to be loaded in the FIFO 16. Simultaneously, with each discrete page image loaded from the decomposer 14 to FIFO 16, the individual page data is assigned an identification number. Along with this identification number is a software object which summarizes the configuration of that individual page image (desired stock, output tray, whether it is monochrome or a color separation, etc.). The page ID's are simultaneously stored in library 22, as shown in FIG. 1. Thus, library 22 maintains a running list of the configurations of page images passing through the FIFO 16.

With continuing reference to FIG. 2, when page images are identified in FIFO 16, the burst manager consults the list of configurations in library 22 to compare the first page in FIFO 16 to the last page which was processed through FIFO 16. Then, if the two adjacent pages in the series are thus "joinable," (i.e., have the same configuration), the new page is attached to the same burst as the previous page. This "attachment" of page image ID's to form a burst is most preferably carried out by creating a data structure of page ID's within library 22. If, however, the adjacent pages are not joinable in a single burst (i.e., they do not have the same configuration), burst manager 20 instructs library 22 to create a new burst, in the form of a new data structure of ID's. In this way, while library 22 forms a sequential set of ID's of page images passing through FIFO 16, those sequences of pages sharing the same print configuration can be identified as a single burst.

Figure 3:
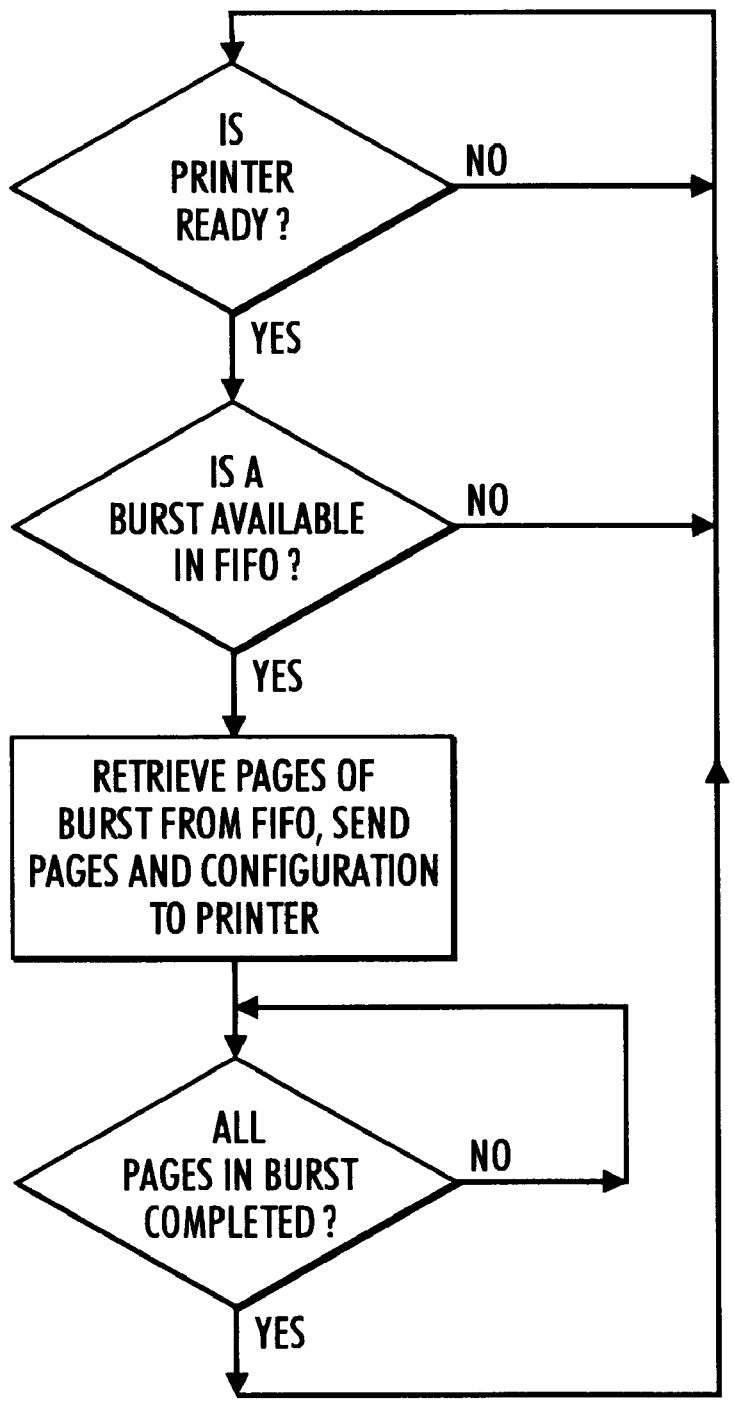
FIG. 3 is a flowchart demonstrating the activity of the "print manager" software which interfaces directly with the "burst manager", the FIFO, and the printing apparatus, according to the present invention.

Once the sequences of page images passing through FIFO 16 are organized as bursts, the "print manager" software 30, which is directly operative of the printer 18, carries out its own decision which is described in FIG. 3. According to the present invention, the print manager software 30 immediately associated with printer 18 requests a series of page images from FIFO 16 one burst at a time.

FIG. 3 shows the simple decision made by the print manager 30 which interfaces to the "burst manager", the FIFO and the marker. As can be seen, the print manager 30 is sensitive to two simple questions, is the printer hardware 18 ready to accept new image data, and are page images available in the FIFO 16. If both of these questions are answered yes, the print manager 30 in effect requests from the burst manager 20 the next burst of FIFO 16 to be sent to the printing hardware 18. The burst manager 20 consults the library 22 and sends forth the page images in the next burst of page images in library 22 to the print manager 30 along with the appropriate print configuration. The print manager 30 then interfaces with the printing apparatus, and the printing apparatus 18 prints out the page images until that particular burst runs out of pages. Then, if the printing apparatus is again ready and data is again available in FIFO 16, the print manager 30 again requests a burst from the burst manager to submit to the printing apparatus. However, because of the burst concept, the 30 will not request the next burst (requiring a different configuration of the printing apparatus 18) until all of the pages in the current burst are output. Once again, depending on the particular sequence of pages to be printed, a burst could simply be series of single page images, or conceivably could be a large number of page images forming a plurality of documents and even forming a plurality of jobs.

Given the basic function of the burst manager 20 according to the present invention, certain subtleties of its operation will be apparent. For example, according to a preferred embodiment of the present invention, although the size of a burst is limited by changes in configuration which are required in printing a series of page images, a burst does not have to be "complete" before the print manager 30 interfacing with the printing apparatus 18 requests page images from the FIFO 16; the decomposer 14 can still create page images joinable in a first burst while other page images within the same burst are being requested by print manager 30. It will be noticed, in FIG. 3, that the print manager 30 merely requests any page images which are available in FIFO 16 at a given time; so, the print manager 30 can request page images as they become available through FIFO 16. This capability presents a desirably short "first print out time" when large jobs, or even a large plurality of jobs, are being printed. The burst concept can optimize a system even if there exists the potential of very large bursts: whatever happens to be in FIFO 16 when the marker is ready, if the pages are "joinable" (of the same print configuration), regardless of whether or not future page images from decomposer 14 are part of the same job, will be defined as a "burst."

Conversely, another advantage of this burst-based system of the present invention is that the arrangement supplies the printing apparatus 18 with pages for output as soon as the printer is available. It is not necessary for an entire document or entire job to be completely decomposed before the printing apparatus 18 can begin operation. This advantage is best seen when considering multiple copies of a document or job: as soon as the final page of the document or job is decomposed by decomposer 14, the page image data for the remaining copies are sent to the printing apparatus 18. Thus, the output of printing apparatus 18 will always be optimized.

Another advantage of the system of the present invention is that burst manager 20 creates new bursts whenever the necessary configuration of printing apparatus 18 is changed, regardless of the beginning or ends of jobs or documents. Thus, it is a trivial matter, with the present invention, to output jobs wherein each job or each document includes sheets of different size or stock.

In summary, one essential feature of the present invention is that the burst manager 20 organizes a series of page image data as series of bursts, each burst corresponding to one configuration of the printing apparatus 18. Beyond defining a series of page image data as bursts, the printing apparatus 18 is made otherwise indifferent to other boundaries of a series of page images, such as boundaries of individual documents or individual jobs. In known prior-art systems, entire documents or entire jobs must typically be completely decomposed before the page image data is sent to the printing apparatus. Significantly, with the present invention, the definition of bursts transcends boundaries of jobs or documents: a job or document may include a plurality of bursts, and a burst can include a plurality of documents or jobs.

While the invention has been described with reference to the structure disclosed, it is not confined to the details set forth, but is intended to cover such modifications or changes as may come within the scope of the following claims.

We claim:

1. A method of submitting page image data, comprising data forming a plurality of discrete page images in a predetermined order, to a printing apparatus, comprising the steps of:

identifying, within the page image data, a series of page images forming a first burst, a burst being a series of page images which can be printed by the printing apparatus without the printing apparatus having to be reconfigured;

the printing apparatus requesting the first burst from the memory and outputting pages resulting from the page image data in the first burst;

the printing apparatus not requesting page image data from a second burst from the memory until all pages from the first burst are output.

2. The method of claim 1, further comprising the step of decomposing page image data joinable with the first burst simultaneous with the printing apparatus outputting pages resulting from page image data in the first burst.

3. The method of claim 1, the first burst including a page image from a first document and a page image from a second document.

4. The method of claim 1, the first burst including a page image from a first job and a page image from a second job.

* * * * *